No. 884,129. PATENTED APR. 7, 1908.
A. J. CLEVELAND & F. S. BROWN.
ELECTRIC SIGNAL.
APPLICATION FILED MAR. 18, 1907.
3 SHEETS—SHEET 1.
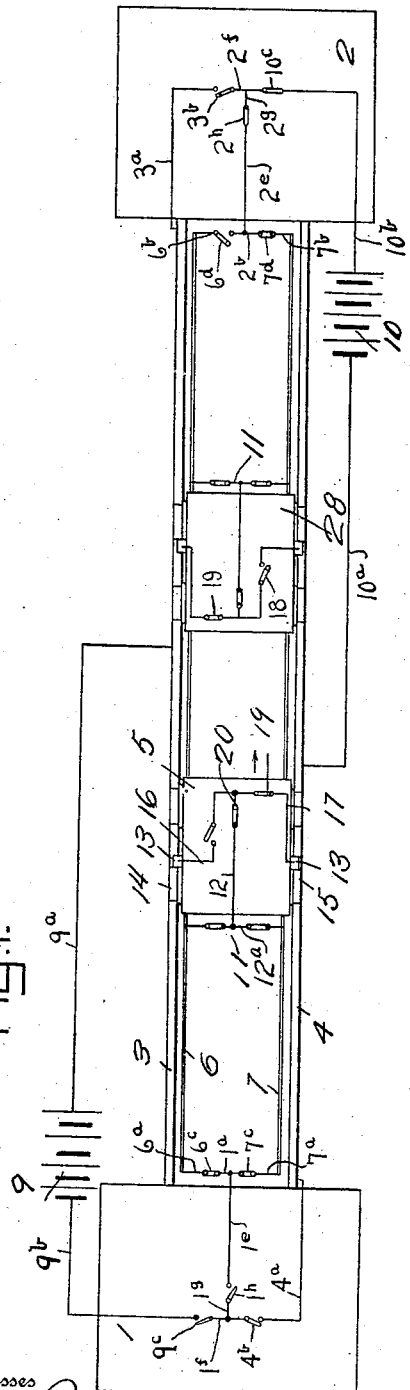

No. 884,129.
PATENTED APR. 7, 1908.
A. J. CLEVELAND & F. S. BROWN.
ELECTRIC SIGNAL.
APPLICATION FILED MAR. 18, 1907.
3 SHEETS—SHEET 2.
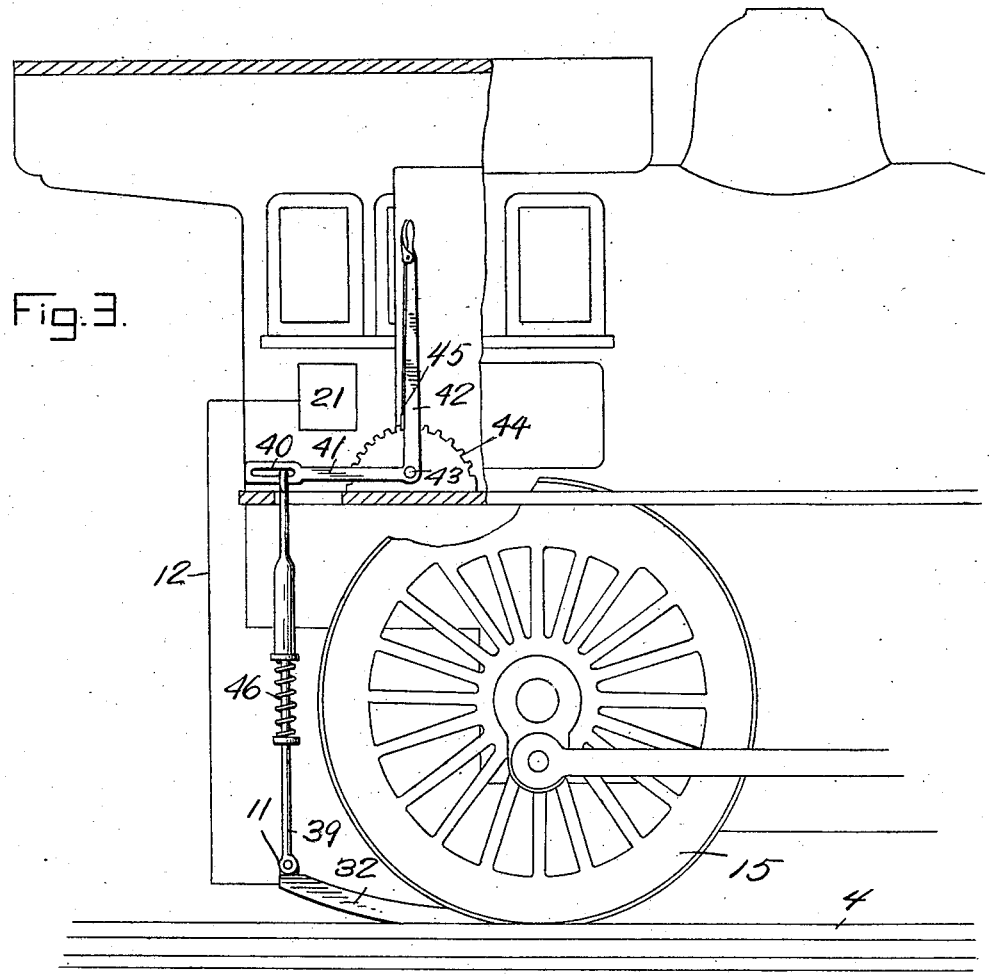
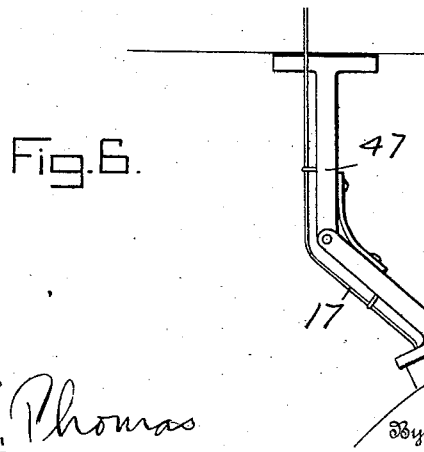

No. 884,129.  
PATENTED APR. 7, 1908.

A. J. CLEVELAND & F. S. BROWN.  
ELECTRIC SIGNAL.  
APPLICATION FILED MAR. 18, 1907.

3 SHEETS—SHEET 3.

Witnesses  
G. R. Thomas  
M. J. Miller

Inventors  
A. J. Cleveland  
F. S. Brown

By Chandler & Chandler  
Attorneys

UNITED STATES PATENT OFFICE.

ARTHUR J. CLEVELAND AND FRANK S. BROWN, OF MINNEAPOLIS, KANSAS.

ELECTRIC SIGNAL.

No. 884,129.  Specification of Letters Patent.  Patented April 7, 1908.

Application filed March 18, 1907. Serial No. 363,142.

*To all whom it may concern:*

Be it known that we, ARTHUR J. CLEVELAND and FRANK S. BROWN, citizens of the United States, residing at Minneapolis, in the county of Ottawa, State of Kansas, have invented certain new and useful Improvements in Electric Signals; and we do hereby declare the following to be a full, clear, and exact description of the invention, such as will enable others skilled in the art to which it appertains to make and use the same.

This invention relates to new and useful improvements in electric signaling devices, and it has particular reference to a signaling system of that type, wherein electrical instruments, such as telephones, telegraph keys, buzzers, and lamps, are carried in the cab of the engine and are constantly in circuit with similar devices in an opposing engine on the same track, signal boxes or terminal stations, whereby the engineer on the moving train may always have verbal or telegraphic communication with the operator stationed at any of the above-mentioned posts.

In connection with a signaling system of the above type, the invention aims as a primary object to provide novel means for closing the circuit between the stationary line conductors and the devices in the engine.

The invention aims as a further object to provide a novel construction, combination, and arrangement of parts, for increasing the general efficiency of the operation and for permitting of a system of comparative simplicity and inexpensiveness of installation.

Figure 4:
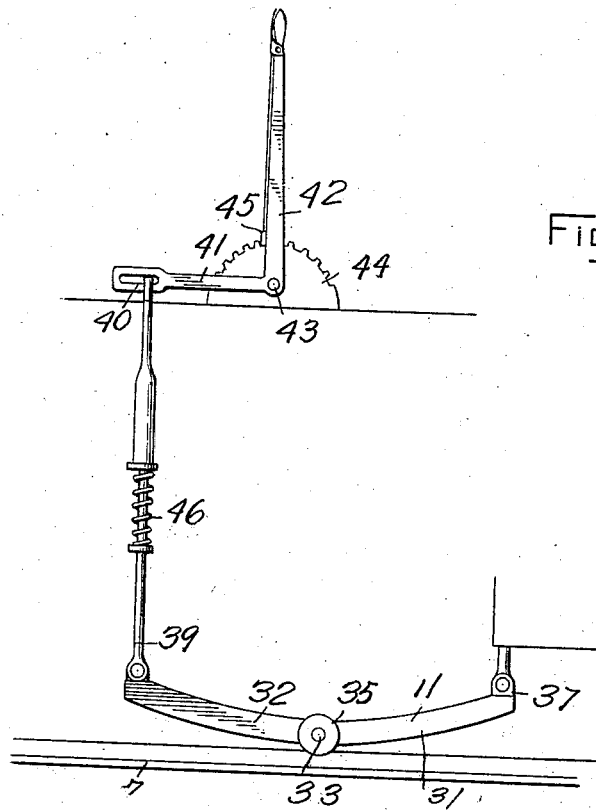
Figure 5:
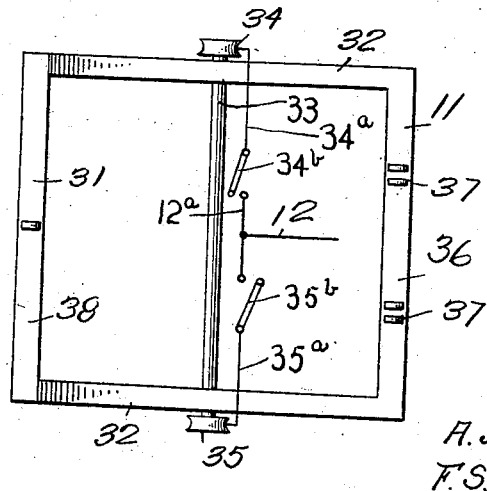

The detailed construction will appear in the course of the following description, in which reference is had to the accompanying drawings forming a part of this specification, like characters of reference designating similar parts throughout the several views, wherein, Figure 1 is a diagrammatic view to show the circuits and circuit closing connections employed conjunctively with the present invention. Fig. 2 is a plan view of the track rails and conductor rails, with their associated parts. Fig. 3 is a side elevation of an engine cab with one wall broken away to more clearly illustrate the cab devices and the circuit closing mechanism suspended from said cab. Fig. 4 is a detail side elevation of the circuit closer and its suspension and elevating means. Fig. 5 is a top plan view of the circuit closing mechanism. Fig. 6 is a detail side elevation of a brush carried by the cab for completing the circuit through the wheels, the tracks having ground connection. Fig. 7 is a diagrammatic view on an enlarged scale showing the connections in one of the engines illustrated in Fig. 1.

Referring specifically to the accompanying drawings, the numerals 1 and 2 designate opposed stations at the ends or at suitable points of a track.

The numerals 3 and 4 designate the tracks between the stations 1 and 2, and the numeral 5 designates an engine moving on said tracks between said stations. Third-rail conductors 6 and 7 are arranged between the tracks 3 and 4 in parallelism thereto, and are supported by insulated brackets 8 fixed to said respective tracks. These conductors are of conventional form, and are preferably T-irons, although suitably supported wire conductors or third-rails may advantageously be employed. Batteries 9 and 10, or other sources of electrical supply, are provided at the respective stations 1 and 2.

One pole of the battery 9 has connection with the rail 3 by a wire $9^a$ and the corresponding pole of the battery 10 has connection with the rail 4 by a wire $10^a$. Wires $9^b$ and $10^b$ lead from the batteries 9 and 10 into the respective stations 1 and 2. The conductors 6 and 7 at their ends adjacent the respective stations 1 and 2 have connection with wires $6^a$ and $6^b$ and $7^a$ and $7^b$. The wires are in turn connected to respective switch members $6^c$ and $6^d$ and $7^c$ and $7^d$ which are designed to connect the respective wires $6^a$ and $7^a$ with a common mid-wire $1^a$ and to connect the wires $6^b$ and $7^b$ with a common mid-wire $2^b$. Branch wires $1^e$ and $2^e$ lead from the mid-wires $1^a$ and $2^b$ into the respective stations 1 and 2. A wire $4^a$ leads from the rail 4 into the station 1 and a wire $3^a$ leads from the rail 3 into the station 2. Within the station 1 is a mid-wire $1^f$ which is designed to be connected with either of the respective wires $9^b$ and $4^a$ by switches $9^c$ and $4^b$. From the wire $1^f$ leads a branch wire $1^g$ which is designed to be connected with the wire $1^d$ by a switch $1^h$. Within the station 2 is a mid-wire $2^f$ similar to the wire $1^f$ and which is designed to be connected with the respective wires $10^b$ and $3^a$ by switches $10^c$ and $3^b$. From the wire $2^f$ leads a branch wire $2^g$ which is designed to be connected with the wire $2^e$ by a switch $2^h$.

Referring to Figs. 3, 4 and 5, it will be observed that a circuit closing mechanism 11 is suspended beneath the cab, and that a wire 12 leads therefrom. Brushes 13 are provided at each side of the cab for engagement in contacting relation with the wheels 14 and 15 upon the respective rails 3 and 4. Wires 16 and 17 lead from the brushes 13 into the cab. The wires 16 and 17 have manually controlled switches 18 and 19, interposed therein, and at their ends are joined to a common wire 20. Between the wires 20 and 12, signaling instruments arbitrarily a telephone apparatus 21 and a telegraph apparatus 22, are interposed. It should be here stated that the wires 12 and 20 are joined so as to form a continuous line designed to be electrically connected by a manually controlled switch 23, and that the telephone and telegraph apparatus 21 and 22 are arranged in shunt with relation to the main wire 12 by means of respective wires 24 and 25, having manually controlled switches 26 and 27, for cutting said apparatus out of or into the main line circuit.

In Fig. 1, the various signaling instruments are shown duplicated in the stations 1 and 2, the engine 5, of course, traveling in the direction of the arrow towards said station 2. Assuming that an engine 28 is on the tracks 3 and 4 between the engine 5 and the station 2, and traveling towards the station 1, it will, of course, be understood that the relative engagement of the conductors 13 with the tracks 3 and 4 is reversed, so that in the case of the engine 28, the wire 16 has its current from the track 4 and the wire 17 from the track 3. When the engine 5 travels towards the station 2, the switch 19 is closed and the switch 18 is opened, and in the engine 28, the switch 19 is likewise closed and the switch 18 open. Of course, this arrangement may be varied when necessary, in accordance with the direction of travel of the engine, as in the case of backing the entire length of a track section or block. If desired, an electric lamp 29 may be employed which lamp is in a circuit 30 arranged in shunt with relation to the main line wire 12 similarly to the telephone and telegraph circuits above described.

Referring especially to Figs. 3, 4, and 5, it will be noted that the circuit closing mechanism 11 comprises a substantially rectangular frame 31, having downwardly curved side-bars 32, centrally between which is supported a transverse shaft 33, carrying at its ends trolleys or pulleys 34 and 35, which ride upon the respective conductors 6 and 7. The frame 31 has its front bar 36 pivotally suspended from the cab by means of insulated supporting brackets or bearings 37. The rear bar 38 of said frame has insulated connection with a vertical link 39, projected through an opening in the floor of the cab and at its upper end having loose pivotal connection by means of the conventional bolt and slot joint 40 with the horizontal arm 41 of an elevating lever 42, which, at the junction of its arms, is pivoted, as at 43, centrally of a toothed-segment 44. The lever 42 carries a manually-operated sliding pawl 45, for engagement with the segment 44. Said lever together with the link 39 constitutes a means for elevating and lowering the frame 31 to selected positions about its pivot bar 36. It is preferred that the link 39 be constituted of resiliently connected sections, between which a connecting expansive coil-spring 46 is interposed, the function of said spring being to force the frame 31 downwardly to the limit of its movement, so that a good contact may be insured between the pulleys or trolleys 34 and 35 and the respective conductors 6 and 7. One of the brushes 13 is illustrated in Fig. 6, in which it will be noted that said brush is carried by an arm or hanger 47, the latter being in turn fixed to a stationary part of the cab.

The wire 12 leads from a cross wire $12^a$ which is designed for connection with respective wires $34^a$ and $35^a$ leading from the trolleys or pulleys 34 and 35, by means of switches $34^b$ and $35^b$. The manner of use will be readily apparent from the foregoing description. As the apparatus and system are shown, when an engine as exemplified by the cab 5, approaches the station 2, the conductor 7 and rail 4 are in use to afford communication and when an engine, as exemplified by the cab 28, approaches the station 1, the conductor 6 and rail 3 are in use, it being understood that the switches 19, 23, and $35^b$ are closed and the switches 18 and $34^b$ are open. The switch 23 is always closed and the switches 26, 27, and $30^a$ are closed either directly with the wire 12 or with the wires 24, 25 and 30 which they control. One of the signaling mechanisms however, must be in circuit with the wire 12 and all of them may be in circuit with said wire 12 if so desired. In the station 2, the switches $2^h$, $10^c$ and $7^d$ are closed while the switches $3^b$ and $6^d$ are open. Assuming that the engineer or operator in the cab 5 desires to communicate with the operator in the station 2, the switches being positioned as aforesaid, the circuit is closed in the usual manner by giving the call signal with the telephone or telegraph key, so as to gain the attention of the operator sought. The circuit is completed from the cab 5 with the station 2 from battery 10 by wires $10^b$, $2^e$, $2^b$ and $7^b$ to conductor 7, from thence by wires $35^a$ and $12^a$, through wire 12 and the signaling devices, thence through wire 17, and wheel 15 to rail 4, returning to battery 10 by wire $10^a$. The circuit between the engine 28 and the station 1 is similar, the conductor 6 and rail 3 being employed to transmit the current.

It will be understood that upon advices from either of the stations to the cabs 5 and 28, of an engine on the same track moving in an opposite direction, the various switches are manipulated so as to afford communication between the cabs and between both the cabs and the stations. By properly adjusting the switches, the stations 1 and 2 may be likewise brought into communication. It is not deemed necessary to set forth these last named circuits as the example given is thought to clearly show the construction and manner of use and intent of the invention.

The provision of the spring 46 serves to prevent the trolleys 34 and 35 from leaving the track, when the engine is rounding curves, or from vibration, the function of said spring being to absorb shocks.

While the elements herein shown and described are well adapted to serve the functions set forth, it is obvious that various minor changes may be made in the proportions, shape, and arrangement of the several parts, without departing from the spirit and scope of the invention as defined in the appended claims.

What is claimed, is—

In an electric signaling system, the combination with an engine cab and rail conductors, of a circuit closing mechanism comprising a rectangular frame pivotally suspended at one end thereof beneath said engine, a transverse axle carried by said frame, contact trolleys provided on the ends of said axle for engagement with said rail conductors, and means for raising and lowering said frame comprising a lever pivoted in said cab and having an angular arm projecting beyond its pivot, and a link pivoted to the end of said arm and to the end of said frame opposite the pivotal suspension thereof, said link including resiliently connected sections.

In testimony whereof, we affix our signatures in presence of two witnesses.

ARTHUR J. CLEVELAND.
FRANK S. BROWN.

Witnesses:
JOHN STRATTON,
DAVID BURNS.